United States Patent
McGrath et al.

(10) Patent No.: US 11,972,767 B2
(45) Date of Patent: Apr. 30, 2024

(54) SYSTEMS AND METHODS FOR COVARIANCE SMOOTHING

(71) Applicant: Dolby Laboratories Licensing Corporation, San Francisco, CA (US)

(72) Inventors: David S. McGrath, Rose Bay (AU); Stefanie Brown, Lewisham (AU); Juan Felix Torres, Darlinghurst (AU)

(73) Assignee: Dolby Laboratories Licensing Corporation, San Francisco, CA (US)

(*) Notice: Subject to any disclaimer, the term of this patent is extended or adjusted under 35 U.S.C. 154(b) by 81 days.

(21) Appl. No.: 17/632,225

(22) PCT Filed: Jul. 31, 2020

(86) PCT No.: PCT/US2020/044670
§ 371 (c)(1),
(2) Date: Feb. 1, 2022

(87) PCT Pub. No.: WO2021/022235
PCT Pub. Date: Feb. 4, 2021

(65) Prior Publication Data
US 2022/0277757 A1    Sep. 1, 2022

Related U.S. Application Data

(60) Provisional application No. 63/057,533, filed on Jul. 28, 2020, provisional application No. 62/881,825, filed on Aug. 1, 2019.

(51) Int. Cl.
*G10L 19/008* (2013.01)
*G10L 19/26* (2013.01)
*G10L 21/0208* (2013.01)
*G10L 25/18* (2013.01)

(52) U.S. Cl.
CPC ............ *G10L 19/008* (2013.01); *G10L 19/26* (2013.01); *G10L 21/0208* (2013.01); *G10L 25/18* (2013.01); *G10L 2021/02082* (2013.01)

(58) Field of Classification Search
CPC .......................... G10L 19/008; G10L 21/0208
See application file for complete search history.

(56) References Cited

U.S. PATENT DOCUMENTS

| | | | | |
|---|---|---|---|---|
| 8,983,844 B1* | 3/2015 | Thomas | ................... | G10L 15/30 704/226 |
| 9,213,703 B1* | 12/2015 | Postelnicu | ............ | G06F 16/635 |
| 9,502,021 B1* | 11/2016 | Kleijn | ................. | G10L 21/0216 |
| 10,638,252 B1* | 4/2020 | Donley | ................ | H04R 1/1083 |
| 2006/0239473 A1* | 10/2006 | Kjorling | ................ | H04S 5/005 381/98 |

(Continued)

FOREIGN PATENT DOCUMENTS

| | | |
|---|---|---|
| EP | 2192694 B1 | 6/2010 |
| GB | 2548325 B | 12/2021 |

(Continued)

*Primary Examiner* — Shaun Roberts

(57) ABSTRACT

Methods and systems for improving signal processing by smoothing the covariance matrix of a multi-channel signal by setting a forgetting factor based on the bins of a band. A method and system for resetting the smoothing based on transient detection is also disclosed. A method and system for resampling for the smoothing during a banding transition is also disclosed.

20 Claims, 5 Drawing Sheets

(56) References Cited

U.S. PATENT DOCUMENTS

| | | | |
|---|---|---|---|
| 2009/0299742 A1* | 12/2009 | Toman | G10L 21/0208 704/E15.039 |
| 2011/0115675 A1* | 5/2011 | Sanayei | H04B 7/0634 342/373 |
| 2011/0137662 A1* | 6/2011 | McGrath | G10L 19/008 704/500 |
| 2014/0056435 A1 | 2/2014 | Ulrik | |
| 2014/0233762 A1* | 8/2014 | Vilkamo | G10H 1/183 381/119 |
| 2015/0180689 A1 | 6/2015 | Deriche | |
| 2016/0005405 A1* | 1/2016 | Yen | H04S 5/00 381/23 |
| 2016/0005407 A1* | 1/2016 | Friedrich | H04S 3/008 381/23 |
| 2016/0055862 A1 | 2/2016 | Wolff | |
| 2016/0064006 A1* | 3/2016 | Disch | G10L 19/20 704/500 |
| 2016/0133262 A1 | 5/2016 | Fueg | |
| 2016/0150343 A1* | 5/2016 | Wang | G10L 21/0272 381/103 |
| 2016/0155456 A1* | 6/2016 | Wang | G10L 19/06 704/208 |
| 2016/0180858 A1 | 6/2016 | Breebaart | |
| 2017/0309292 A1 | 10/2017 | Eddington, Jr. | |
| 2018/0012607 A1 | 1/2018 | Setiawan | |
| 2018/0240470 A1* | 8/2018 | Wang | G10L 19/008 |
| 2018/0240471 A1 | 8/2018 | Markovich Golan | |
| 2019/0045065 A1* | 2/2019 | Hera | H04B 3/23 |
| 2019/0122674 A1* | 4/2019 | Wang | G10L 19/008 |
| 2019/0318757 A1* | 10/2019 | Chen | G10L 19/022 |
| 2021/0176579 A1* | 6/2021 | Laitinen | H04R 5/027 |

FOREIGN PATENT DOCUMENTS

| | | |
|---|---|---|
| KR | 20030013579 A | 2/2003 |
| RU | 2660638 C2 | 7/2018 |
| WO | 2017176941 A1 | 10/2017 |
| WO | 2019016494 A1 | 1/2019 |
| WO | 2019057847 A1 | 3/2019 |

\* cited by examiner

SYSTEMS AND METHODS FOR COVARIANCE SMOOTHING

CROSS-REFERENCE TO RELATED APPLICATIONS

This application claims the benefit of U.S. Provisional Patent Application No. 62/881,825, filed 1 Aug. 2019, and U.S. Provisional Patent Application No. 63/057,533 filed 28 Jul. 2020, which are incorporated herein by reference.

TECHNICAL FIELD

The present disclosure relates to improvements for the processing of signals. In particular, this disclosure relates to processing audio signals to improve covariance smoothing for improved processing.

BACKGROUND

An aspect of audio signal processing includes presenting multi-channel audio to a listener such that the listener can determine virtual spatial locations for the audio, giving an immersive experience to the listener. An early implementation of this is stereo, where the listener can spatially determine the "direction" a sound comes from.

More recent developments in this technology use inter-channel dependencies of a multi-channel system to present a more fully immersive sound experience. This can include the use of a covariance matrix of the audio channels.

SUMMARY

Various signal processing systems and methods are disclosed herein. Some such systems and methods may involve smoothing the covariance values for a band over successive frames.

In some examples, a system and method for smoothing an estimate of covariance matrix for a sequence of signal frames in a frequency band, the method comprising: for the signal frames, comparing an effective count of bins in the frequency band to a desired count of bins for the frequency band; computing a forgetting factor for the band as a ratio of the effective count to the desired count; and if the effective count of bins in the frequency band is smaller than the desired count, generating a current estimate of a value of the covariance matrix value for a present frame using a previously generated estimate of a value of the covariance matrix value for a previous frame relative to the present frame and the forgetting factor; wherein the comparing, computing, and generating are performed by a system including one or more computer processors. The smoothed covariance matrix can be used for improved further processing of the signal by reducing artifacts caused by rough transitions in the matrix.

In some such examples, the system and method may involve calculating the effective number of bins as a sum of filterbank response values for the frequency band.

In some such examples, the generating uses a first order filter.

In some such examples, the first order filter includes a difference between the value for the present frame and the previously generated estimate for the previous frame, the difference weighted by the forgetting factor.

In some such examples, the system and method also includes comparing the forgetting factor with a maximum forgetting factor; and setting the forgetting factor to the minimum of the calculated forgetting factor and the maximum permitted forgetting factor; wherein the comparing and setting are performed before the generating the current estimate of the value of the covariance matrix for the present frame.

In some such examples, the system and method also includes detecting whether a transient occurs within a monitored frame; and resetting the smoothing in response to detecting that the transient occurs by setting a current estimate of a value of the covariance matrix value for the monitored frame to an original value of a covariance matrix value for the monitored frame without use of the forgetting factor for the monitored frame. The detecting can be performed by using aspects of a ducking decorrelator.

In some such examples, the system and method also includes storing the current estimate of the covariance matrix of the present frame; and resampling the stored current estimate over frequency bands, converting from one banding structure to another banding structure.

The system and method can be a part of an audio signal decoder.

Some or all of the methods described herein may be performed by one or more devices according to instructions (e.g. software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure may be implemented in a non-transitory medium having software stored thereon. The software may, for example, be executable by one or more components of a control system such as those disclosed herein. The software may, for example, include instructions for performing one or more of the methods disclosed herein.

At least some aspects of the present disclosure may be implemented via an apparatus or apparatuses. For example, one or more devices may be configured for performing, at least in part, the methods disclosed herein. In some implementations, an apparatus may include an interface system and a control system. The interface system may include one or more network interfaces, one or more interfaces between the control system and memory system, one or more interfaces between the control system and another device and/or one or more external device interfaces. The control system may include at least one of a general-purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to one or more processors.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements, but different reference numbers do not necessarily designate different elements between different drawings.

DETAILED DESCRIPTION

Figure 1:
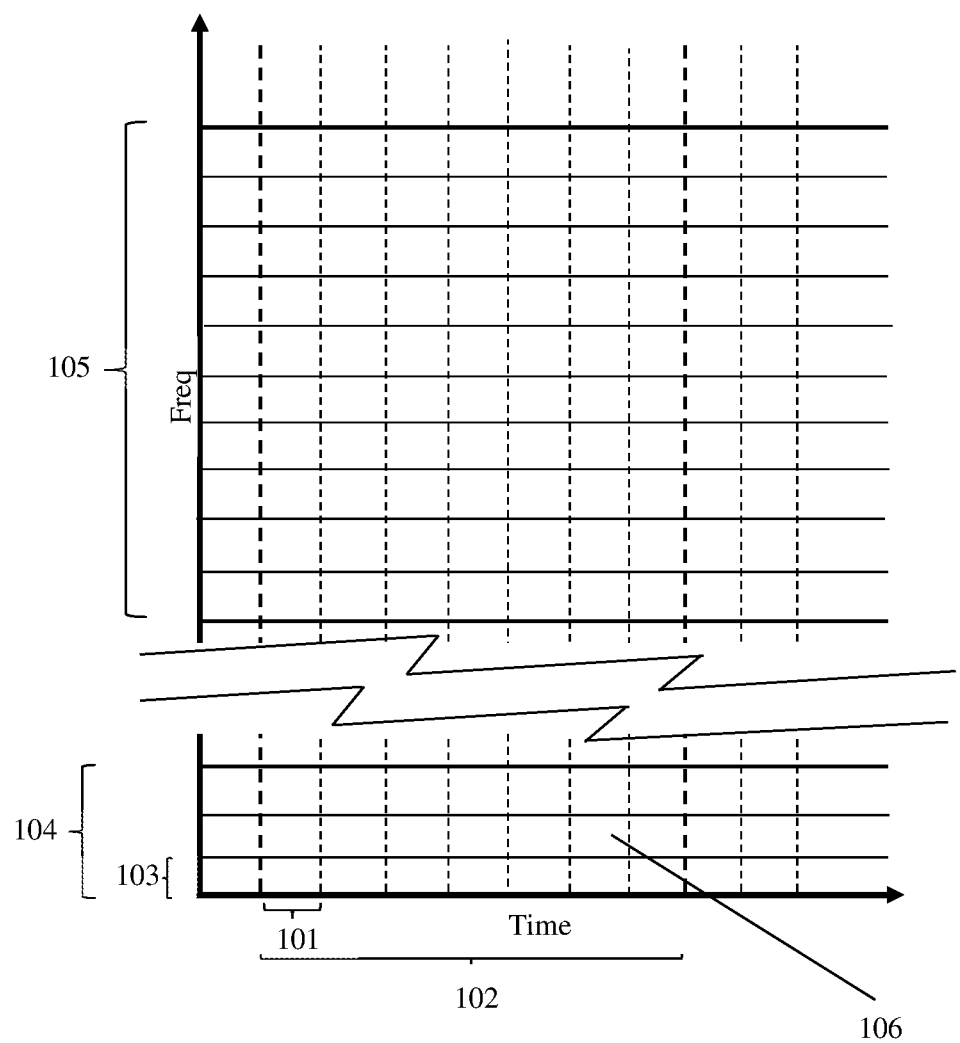
FIG. 1 illustrates an example of a signal channel separated into samples, frames, bins, and bands.

The present disclosure describes methods and systems for smoothing the values of an estimated matrix (e.g. a covariance matrix) over time, including cases where the estimate is calculated from a small number of samples, such that the un-smoothed variation of those values could cause issues, such as noticeable artifacts in the output (e.g. audio).

The present disclosure also describes (among other things) the use of transient detection to prevent over-smoothing the values, thereby preventing adding unwanted artifacts from the smoothing.

The term "smoothing" as used herein refers to reducing the variation of a value of sequential frames of a signal. For example, reducing the variation of covariance values over sequential frames.

The term "covariance" as used herein refers to the measure of the joint variability of two signals. For example, the covariance of the energies of the signals.

A "covariance matrix" as used herein refers to a matrix of covariances of multiple signals. "Banded covariance matrix" refers to a covariance matrix where several adjacent frequency bins of the per-bin covariance matrix are combined into a band, such that the covariance can be represented by significantly fewer numbers (equal to the number of bands). For example, an input with 960 frequency bins can become 12 frequency bands with the 960 bins distributed, equally or unequally, among the 12 bands. For the examples provided herein, the "covariance matrix" is taken to be a banded covariance matrix.

An "estimated matrix" as used herein refers to a sample covariance matrix. As used herein, "covariance matrix" and "smoothed matrix" includes estimated matrices.

The term "complex advanced coupling" (CACPL) as used herein refers to a method of stereo encoding, whereby left and right signals are combined into mid (L+R)/2, and side (L−R)/2 signals, and then the side signal is then predicted from the mid.

The term "smoothing algorithm" as used herein refers to smoothing a covariance matrix in accordance with the present disclosure, in particular, smoothing based on an effective bin count of a band. The term "smoothed matrix" as used herein refers to a covariance matrix modified by the smoothing algorithm.

The term "effective bin count" as used herein refers to either an actual count of the number of bins in a band or an estimation of the count of the effective bins in a band. An example of an estimation of the count of the effective bins in a band includes summing the filterbank response values for that band.

The term "forgetting factor" as used herein refers to a weighting value that modifies the significance of a part of a function.

The term "DTX" as used herein refers to an encoder module that handles discontinuous transmission events.

A solution to the problem of smoothing the covariance of input channels is described herein. This improves the technology of signal processing, for example for voice and audio services, such as ones providing users with an immersive experience (e.g. virtual reality, augmented reality).

In digital signal processing as shown in FIG. 1, an input signal (channel) is divided in the time domain into frames 101. A sequence of successive frames can be grouped together into a "frame sequence" 102. In the frequency domain, the signal can be divided up into frequency intervals called bins 103. A given bin at a given frame is called a sample 106.

The bins can be grouped together in a frequency band 104/105. This allows statistical averaging over a given band for a given windowed frame/frame sequence (a "window" being a weighting function applied to a frame or frame sequence). One usage of this averaging is for estimating the covariance between audio channels.

Not all bands necessarily contain the same number of bins. For example, lower frequency bands 104 might have a lower number of bins per band than higher frequency bands 105. This means that, for statistical analysis, the lower frequency bands require a larger window (more frames) per bin to produce meaningful statistical results than a higher frequency band would require. A given bin at a given frame can have a signal energy associated with it, and several bin values can be averaged over a band and/or window.

Covariance Matrix Example

Taking complex advanced coupling (CACPL) as an example, the parameters $\alpha$ (complex prediction coefficient) and $\beta$ (real decorrelation coefficient) may be calculated from the elements of a (2×2) mid-side covariance matrix $\Sigma_{MS}$. This matrix is calculated over a series of analysis bands $1 \leq b \leq B$.

$$\Sigma_{MS}(b) = \begin{bmatrix} R_{MM}(b) & R_{MS}(b) \\ R_{SM}(b) & R_{SS}(b) \end{bmatrix} \qquad \text{eq. 1}$$

$$\alpha(b) = \frac{R_{SM}(b)}{R_{MM}(b)}, \beta(b) = \sqrt{\frac{R_{SS}(b)}{R_{MM}(b)} - \alpha(b)^2}$$

where terms in the form $R_{XY}(b)=X(b)Y(b)^*$ are the covariance of signals X and Y calculated over a frequency band b. Superscript * denotes the complex conjugate transpose of the value. The example above is a 2×2 covariance matrix. In various implementations, any number of input channels are possible (for example, a four-channel system with a 4×4 covariance matrix). The example above is for mid (M) and side (S) signals, but one skilled in the art can extrapolate the above for other signal types.

Smoothing Function and Forgetting Factor

Generally, the smoothed matrix can be calculated using a low-pass filter designed to meet the smoothing requirements. In the case of the smoothing algorithm, the smoothing requirements are such that previous estimates are used to artificially increase the number of frequency samples (bins) used to generate the current estimate of a covariance matrix. In some embodiments, calculating the smoothed matrix A from an input covariance matrix A over a frame sequence uses a first order auto-regressive low pass filter that uses a weighted sum of past and present frames' estimated matrix values:

$$\tilde{A}[n]=\tilde{A}[n-1]+\lambda(A[n]-\tilde{A}[n-1]) \qquad \text{eq. 2}$$

where λ is a forgetting factor, or an update rate, i.e. how much emphasis is placed on previous estimation data and n is the frame number. In some embodiments, this only has meaning for the frames after the first frame, as there is no value for A[0]. In some embodiments, A[0] is given the value of 0, resulting in a smoothing of A[1]. In some embodiments, A[0] is given the value of A[1], resulting in no smoothing of A[1]. The algorithm in equation 2 is an example of an algorithm that can be used for the smoothing algorithm, but other equations can also be used. For example, while equation 2 shows a first order low pass filter, a higher order filter design can also be used. The important factors of the algorithm (smoothing function) are the looking-back aspect of using previously smoothed results and the forgetting factor to give weight to the influence of those results.

Forgetting Factor

The effect of the forgetting factor is that, as the smoothing is applied over successive frames, the effect of previous frames becomes less and less impactful on the smoothing of the frame being smoothed (adjusted).

When the forgetting factor in the equation 1 is one (λ=1), no smoothing occurs and it effectively acts as an all-pass filter. When 0<λ<1 the equation acts as a low pass filter. The lower λ places more emphasis on the old covariance data, while a higher λ takes more of the new covariance into account. A forgetting factor over one (e.g. 1<λ<2) implements as a high pass filter. In some embodiments, a maximum permissible forgetting factor $\lambda_{max}$ is implemented. This maximum value will determine the behavior of the algorithm once the bins/band values become large. In some embodiments, $\lambda_{max}$<1 will always implement some smoothing in every band, regardless of what the calculated forgetting factor is; and $\lambda_{max}$=1 will only apply the smoothing function to bands with less bins than the desired $N_{min}$, leaving larger bands unsmoothed.

In some of those embodiments, the forgetting factor for a particular band $\lambda_b$ is calculated as the minimum of the maximum permitted forgetting factor $\lambda_{max}$ and the ratio of the effective number of bins in the band $N_b$ and the minimum number of bins $N_{min}$ that are determined to give a good statistical estimate based on the window size.

$$\lambda_b = \min\left(\lambda_{max}, \frac{N_b}{N_{min}}\right) \qquad \text{eq. 3}$$

In some embodiments $N_b$ is the actual count of bins for the frequency band. In some embodiments, $N_b$ can be calculated from the sum of a particular band's frequency response, e.g. if a band's response is r=[0.5, 1, 1, 0.5, 0, . . . , 0], the effective number of bins $N_b$=sum(r)=0.5+1+1+0.5=3. In some embodiments, $\lambda_{max}$=1 such that $\lambda_b$ stays within a reasonable range, e.g. 0≤$\lambda_b$≤1. This means that smoothing is applied proportionally to small sample estimates, and no smoothing is applied at all to large sample estimates. In some embodiments, $\lambda_{max}$<1 which forces larger bands to be smoothed to a certain extent regardless of their size (e.g. $\lambda_{max}$=0.9). In some embodiments, $N_{min}$ can be selected based on the data at hand that produces the best subjective results. In some embodiments, $N_{min}$ can be selected based on how much initial (first subsequent frame after the initial frame of a given window) smoothing is desired.

In an example, using an analysis filterbank with narrower (i.e. fewer bins, more frames needed for good statistical analysis) low-frequency bands and wider (i.e. more bins, less frames needed for good statistical analysis) high-frequency bands, this would have the effect of increasing the amount of smoothing in lower frequency bands and decreasing the amount (or not smoothing at all if $\lambda_{max}$=1) in higher frequency bands.

Figure 2:
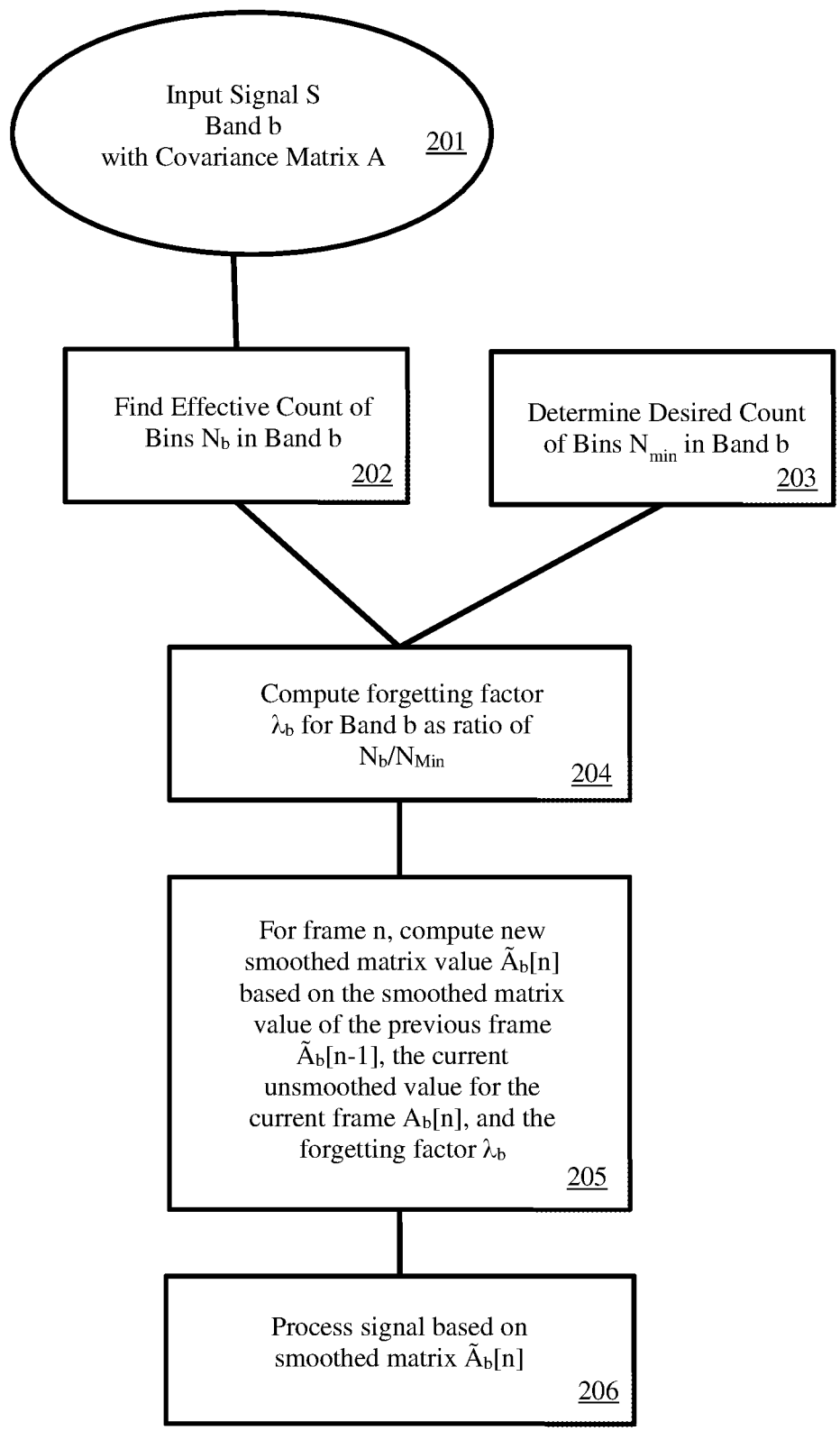
FIG. 2 illustrates a flowchart for an example method to smooth a signal covariance matrix using the smoothing algorithm.

An example process flow for this method is shown in FIG. 2. An input signal FFT (fast Fourier transform) 201 provides for a given band in an input signal a corresponding covariance matrix over a window. An effective count of the bins for that band is taken 202. This can be, for example, calculated by the filterbank response values of the band. A desired bin count is determined 203, for example by a subjective analysis of how many bins would be needed to provide a good statistical analysis for the window. A forgetting factor is computed 204 by taking a ratio of the calculated number of bins to the desired bin count. For a given frame (other than the first frame), a new covariance matrix value is computed 205 based on the new covariance value computed for the previous frame, the original value for the current frame, and the forgetting factor. The new (smoothed) matrix formed by these new values is used in further signal processing 206.

Figure 3:
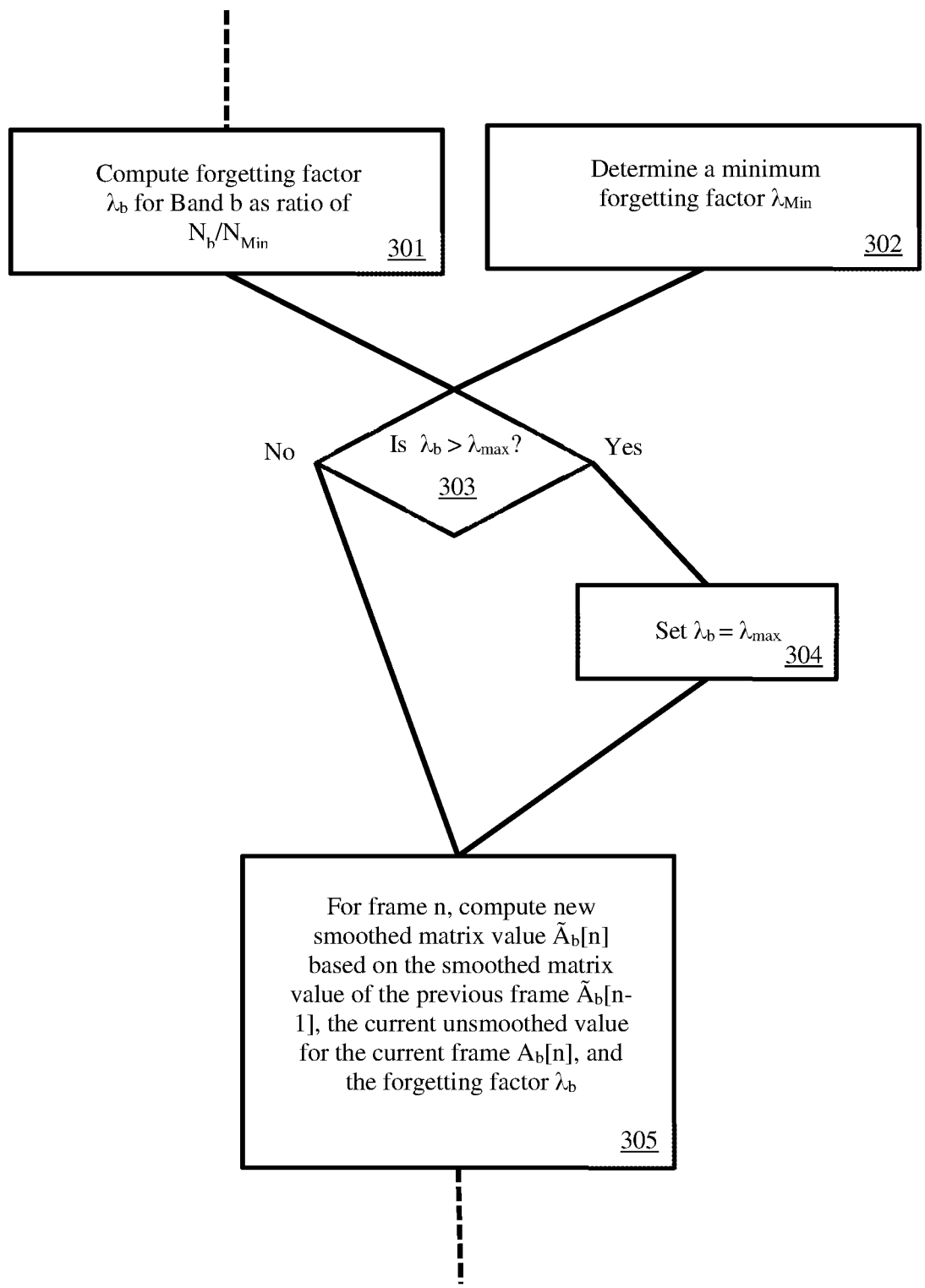
FIG. 3 illustrates a flowchart (partial) for an example method to smooth a signal covariance matrix using the smoothing algorithm with maximum forgetting factor.

FIG. 3 shows an example modification to the flow for a maximum permitted forgetting factor. As in FIG. 2, a forgetting factor is computed 301 for the band. Additionally, a maximum permitted forgetting factor is determined 302. The values are compared 303, and in response to the calculated factor being less than the maximum permitted factor, then the calculated factor is used in the smoothing 305. If the calculated factor is greater than the maximum permitted factor, the maximum permitted factor is used 304 in the smoothing 305. The example shows the calculated factor being used if the factors are equal (not greater than), but an equivalent flow can be envisioned where the minimum value is used if they are equal.

Smoothing Reset

In some embodiments, there may be a desire avoid smoothing over transients (sudden changes in signal magnitude) as this may produce unwanted signal distortion/artifacts in the output. In these embodiments, the smoothing can be "reset" at points where transients are detected in the signal.

The previous time frame's estimated matrix can be stored to facilitate calculation the smoothed value for the current frame. If a transient is detected in the input signals during that frame, the smoothing function can be set to re-initialize itself.

When a transient is detected, the past matrix estimate is reset to the current estimate, such that the output of the smoothing filter after a transient is the estimate itself (no change applied). In other words, for the reset frame $\tilde{A}_b[n]$= $A_b[n]$. After the reset frame, subsequent frames can have the smoothing function applied again until the next reset.

Figure 4:
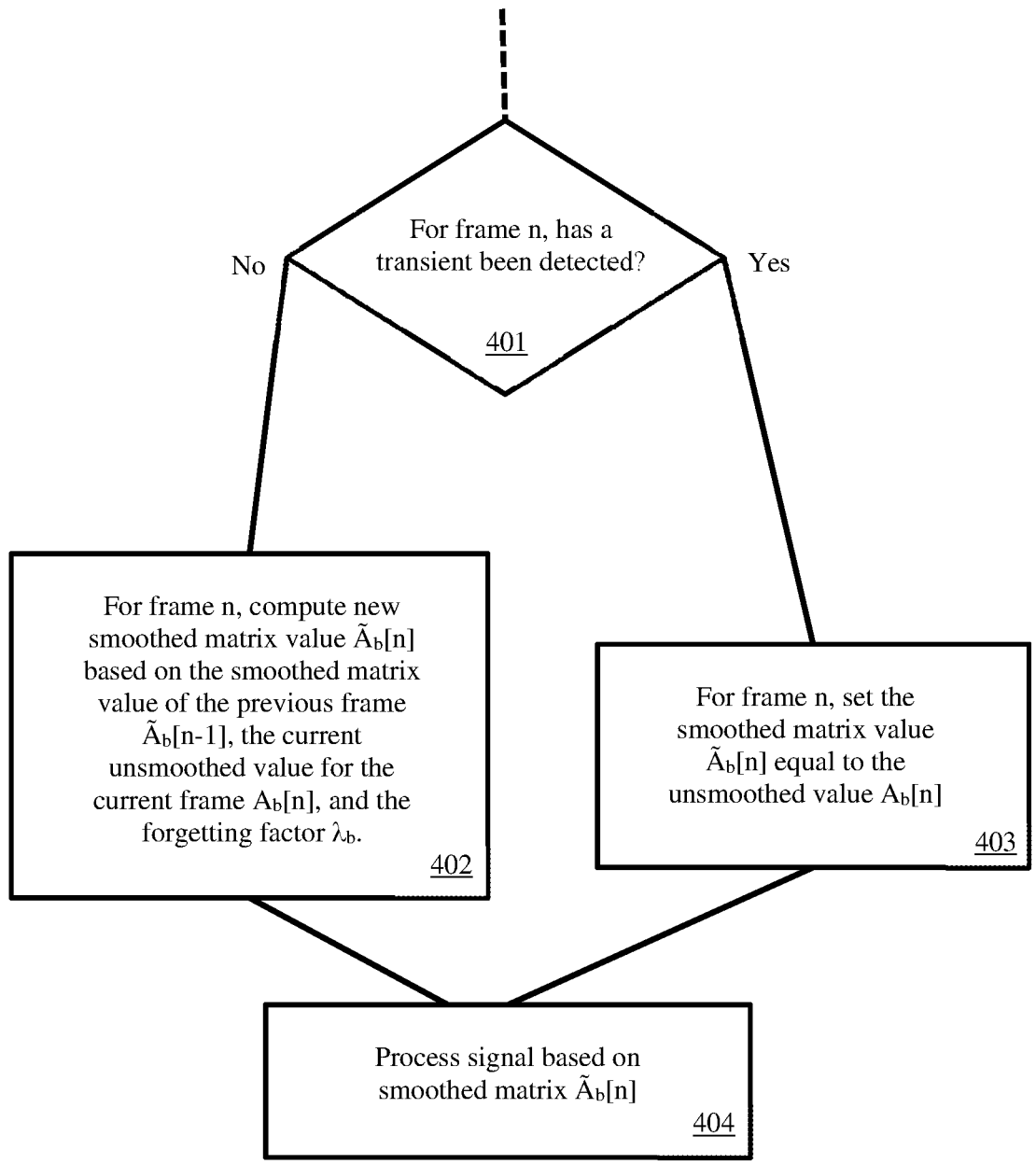
FIG. 4 illustrates a flowchart (partial) for an example method to smooth a signal covariance matrix using the smoothing algorithm with transient detection.

FIG. 4 shows an example modification to the flow for transient detection. A determination is made 401 if a transient is detected for a given frame. If it is 403, then the new matrix value remains the same as the input value. If not 402, the usual smoothing algorithm is used for that frame. The combination (matrix) of smoothed and non-smoothed (transient) frame values are used for signal processing 404.

In some embodiments, the smoothing is reset when a transient is detected on any channel. For example, if there are N channels, N transient detectors can be used (one per channel) and if any of them detect a transient, the smoothing is reset or end of signal or end of smoothing (smoothing is turned off).

For the example of a stereo input, the channels may be determined to be distinct (or possibly distinct) enough such that only considering transients in the left channel might mean an important transient in the right channel may be improperly smoothed (and vice versa). Therefore, two transient detectors are used (left and right) and either one of these can trigger a smoothing reset of the entire 2×2 matrix.

In some embodiments, the smoothing is only reset on transients for certain channels. For example, if there are N channels, only M (<N, possibly 1) detectors are used.

For the example of a First Order Ambisonics (FOA) input, the first (W) channel can determined to be the most important compared to the other three (X, Y, Z) and, given the spatial relationships between FOA signals, transients in the latter three channels will likely be reflected in the W channel anyway. Therefore, the system can be set up with a transient detector only on the W channel, triggering a reset of the entire 4×4 covariance matrix when it detects a transient on W.

In some embodiments, the reset only resets covariance elements that have experienced the transient. This would mean that a transient in the $n^{th}$ channel would only reset values in the $n^{th}$ row and in the $n^{th}$ column of the covariance matrix (entire row and entire column). This can be performed by having separate transient monitoring on each channel and a detected transient on any given channel would trigger a reset for matrix positions that correspond to that channel's covariance to another channel (and vice versa, and, trivially, to itself).

In some embodiments, the reset only occurs on majority/threshold number of channels detecting a transient. For example, in a four channel system, the threshold could be set to trigger a reset only if at least two of the channels report a transient in the same frame.

Transient Detection Example

An example of a transient detector is to use ducking gain property of a ducking decorrelator, which can be used to determine if a transient has occurred in a single input channel. See, e.g., U.S. Pat. No. 9,747,909, the contents of which are incorporated by reference herein. Sudden decreases in the ducking gain occur at transients. The change in the ducking gain can be compared to a threshold value to determine if a transient occurred. The threshold value can be determined by subjective evaluation of what provides an accurate transient detection.

The example transient detector works in the following manner

1. The input signals are high pass filtered to enhance the transients.
2. The absolute value of the high pass filter output signal is then low pass filtered to determine the signal envelope.
3. Two envelopes are generated, fast $e_f[n]$ and slow $e_s[n]$, using two different low pass filters with slightly different cut off frequencies, $\omega_f > \omega_s$.
4. For each time-domain sample n of the signal envelopes within a particular frame, where $1 \leq n \leq N$, if $$1.1 e_s[n] < g_d[n-1] e_f[n] \quad \text{eq. 4}$$

then the ducking gain $g_d$ is decreased to $$g_d[n] = 1.1 \frac{e_s[n]}{e_f[n]} \quad \text{eq. 5}$$

otherwise the gain is allowed to rise slowly back to 1, following:

$$g_d[n] = (g_d[n-1] - 1)e^{-\frac{1}{\tau_d F_s}} + 1 \quad \text{eq. 6}$$

where $\tau_d$ is the time constant determining how quickly the ducking gain returns to 1.

5. If there has been a large change in the ducking gain over the current frame, it is deemed that a transient has occurred: i.e.

$$d_g[1] - d_g[N] > \text{threshold} \quad \text{eq. 7}$$

In some embodiments, the method to determine a transient's occurrence from the ducking gain is counting the number/fraction of time-domain samples within each frame that the condition above is met. If this value passes a particular threshold, the frame is determined to contain a transient.

While ducking gain can be used for transient detection for the smoothing algorithm, any method of transient detection known in the art can be utilized.

Resampling (Banding Transition)

In some embodiments, a band undergoing smoothing can be converted to a new band for the smoothing when the banding of the channel changes. If the input signal banding changes from one frame to the next, in terms of number and/or bandwidths (e.g., because of a filterbank switch at the encoder), the stored (previous) matrix estimate can be resampled to the new banding structure in order to continue with uninterrupted operation of the smoothing mechanism. A conversion matrix between banding structures can be calculated by taking the set of windowing functions in the frequency domain, i.e. the ideal filterbank magnitude responses for the previous banding scheme (i.e., the previous filterbank), as a matrix.

As an example:

Bank$_1$ is a (B$_1$×F) array containing rows of previous ideal filterbank responses FR1, and Bank$_2$ is a (B$_2$×F) array containing the new filterbank ideal responses FR2. F is the number of frequency bins.

$$\text{Bank}_1 = [FR1_1^T \ldots FR1_{b_1}^T \ldots FR1_{\{B_1\}B_1}^T]^T$$

$$\text{Bank}_2 = [FR2_1^T \ldots FR2_{b_2}^T \ldots FR2_{\{B_2\}B_2}^T]^T$$

The elements of the conversion matrix $C_{b_1 \to b_2}$ that convert a band $b_1$ from Bank$_1$ to a band $b_2$ from Bank$_2$:

$$C_{b_1 \to b_2} = \frac{FR1_{b_1} FR2_{b_2}^*}{\sum_{b=1}^{B_1} FR1_b FR2_{b_2}^*} \quad \text{eq. 8}$$

creating a (B$_1$×B$_2$) matrix that can be used to convert the previous banded estimates to the new banding scheme.

Example of Smoothing with Reset

Given an example of a single band b of a 1×1 covariance matrix $A_b[n]$, where the band consists of 3 bins ($N_b=3$) but it is determined (subjectively) that at least 8 bins ($N_{min}=8$) are needed for good statistical analysis. This gives a band forgetting factor of $\lambda_b = 3/8$.

If the initial banded covariant matrix is (first frame and transients shown in bold):

$$A_b[n] = [0.1, 0.05, 0.01, 0.05, 0.1, 0, 0.9, 0.1, 0.05, 0.01, 0.05]$$

and a transient detector with the following output, indicating the first frame and the seventh frame containing transients:

$$T[n]=[1,0,0,0,0,0,1,0,0,0,0]$$

The smoothed covariance output would look like:

$$\tilde{A}_b[n]=[0.1,0.0813,0.0545,0.0528,0.0705,0.0478,0.9, 0.6,0.3937,0.2498,0.1749]$$

The first frame remains the same in $\tilde{A}[n]$ as it was in $A[n]$ as smoothing does not start until the second frame, due to the transient indicated in the first. If there was no transient in the first frame, the first frame can be smoothed by, in one embodiment, taking the previous frame as having a zero value, or as, in another embodiment, having a value equal to itself; the situation depending on how the algorithm is configured. In some embodiments, the first frame is always marked as having a transient detected regardless of any actual detection taking place. The seventh value of $\tilde{A}[n]$ is the same as the one from $A[n]$ due to the smoothing reset.

The second frame uses the values of itself (0.05), the "smoothed" value of the previous frame (0.1), and the forgetting factor (⅜) to calculate the smoothed value of $\tilde{A}[2]$ (approx. 0.813). The formula being in this example (first order filter):

$$\tilde{A}[2]=\tilde{A}[1]+\lambda(A[2]-\tilde{A}[1])=0.1+(⅜)(0.05-0.1)=0.8125$$

This is repeated for subsequent frames until it reaches frame 7, which in T[n] is designated as having a transient. For this, $\tilde{A}[7]=A[7]=0.9$. The subsequent frames are then calculated by the smoothing function again (as if frame 7 was an initial frame).

Figure 5:
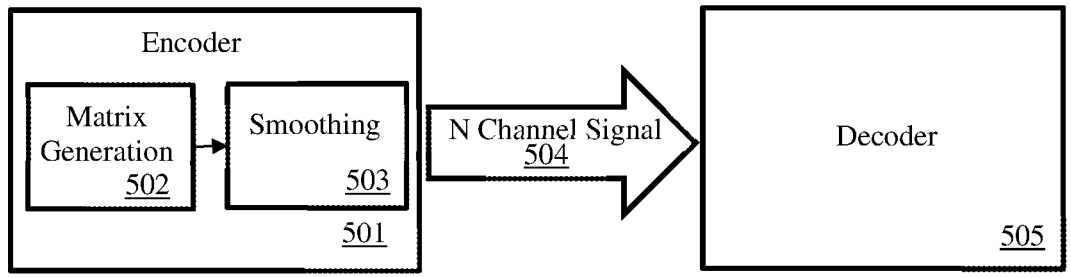
FIG. 5 illustrates an example encoder/decoder system with the smoothing algorithm in the encoder.

In some embodiments, the covariant matrix smoothing system can be integrated into an encoder. An example system is provided in FIG. 5. The example encoder 501 generates 502 one or more covariance matrices for a signal 504 which the smoothing algorithm 503 modifies before the signal 504 is sent to the decoder 505.

Figure 6:
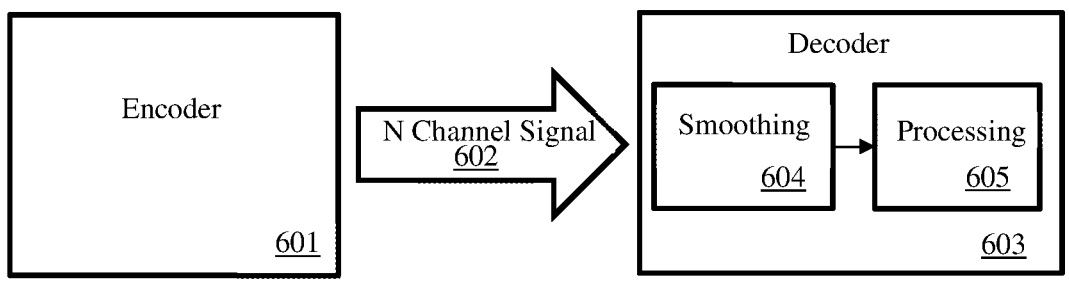
FIG. 6 illustrates an example encoder/decoder system with the smoothing algorithm in the decoder.

In some embodiments, the covariant matrix smoothing system can be integrated into a decoder. An example of a decoder with the smoothing algorithm is shown in FIG. 6. The encoder 601 sends a signal 602 (e.g. audio channels) to the decoder 603. The decoder 603 applies the smoothing algorithm 604 before further processing 605 is performed (there may be processing before smoothing as well).

Figure 7:
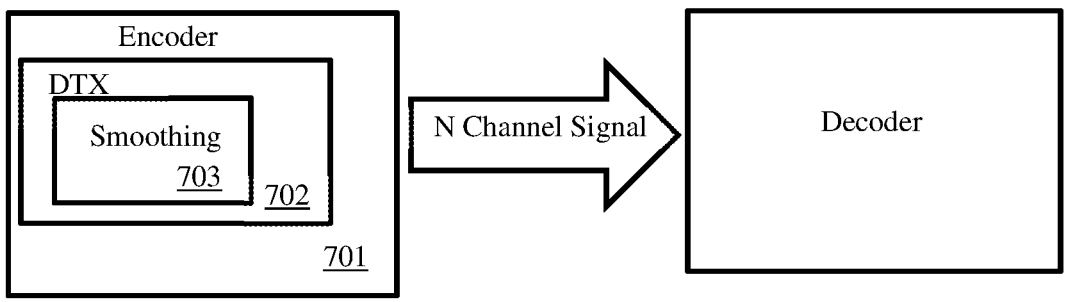
FIG. 7 illustrates an example encoder/decoder system with the smoothing algorithm as part of a DTX.

In some embodiments, covariance smoothing may also be used in the encoder in the case of discontinuous transmission (DTX) frames, to stabilize parametrization of spatial comfort noise. In this instance, during DTX frames, there will be no resetting of the covariance smoothing due to transients, and instead it will be reset upon entry/exit of the codec's DTX mode. An example of an encoder with the smoothing algorithm is shown in FIG. 7, where the encoder 701 has a DTX module 702 which incorporates the smoothing algorithm 703.

A number of embodiments of the disclosure have been described. Nevertheless, it will be understood that various modifications may be made without departing from the spirit and scope of the present disclosure. Accordingly, other embodiments are within the scope of the following claims.

A computing device implementing the techniques of covariance smoothing can have the following example architecture. Other architectures are possible, including architectures with more or fewer components. In some implementations, the example architecture includes one or more processors (e.g., dual-core Intel® Xeon® Processors), one or more output devices (e.g., LCD), one or more network interfaces, one or more input devices (e.g., mouse, keyboard, touch-sensitive display) and one or more computer-readable mediums (e.g., RAM, ROM, SDRAM, hard disk, optical disk, flash memory, etc.). These components can exchange communications and data over one or more communication channels (e.g., buses), which can utilize various hardware and software for facilitating the transfer of data and control signals between components.

The term "computer-readable medium" refers to a medium that participates in providing instructions to processor for execution, including without limitation, non-volatile media (e.g., optical or magnetic disks), volatile media (e.g., memory) and transmission media. Transmission media includes, without limitation, coaxial cables, copper wire and fiber optics.

Computer-readable medium can further include operating system (e.g., a Linux® operating system), network communication module, audio interface manager, audio processing manager and live content distributor. Operating system can be multi-user, multiprocessing, multitasking, multithreading, real time, etc. Operating system performs basic tasks, including but not limited to: recognizing input from and providing output to network interfaces 706 and/or devices 708; keeping track and managing files and directories on computer-readable mediums (e.g., memory or a storage device); controlling peripheral devices; and managing traffic on the one or more communication channels. Network communications module includes various components for establishing and maintaining network connections (e.g., software for implementing communication protocols, such as TCP/IP, HTTP, etc.).

Architecture can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method of providing an audio service, the method comprising:
    for a time-domain sequence of signal frames, comparing an effective count of bins in a frequency band to a desired count of bins for the frequency band;
    computing a forgetting factor for the frequency band as a ratio of the effective count to the desired count;
    for each frequency band of a plurality of frequency bands, in response to determining that the effective count of bins in the frequency band is smaller than the desired count, generating a respective smoothed band-specific covariance matrix for a present signal frame using a previously generated value of the respective smoothed band-specific covariance matrix for a previous signal frame relative to the present signal frame and the forgetting factor; and
    generating an audio signal for the audio service using frequency domain representations of the time-domain sequence of signal frames and further using corresponding sets of the respective smoothed band-specific covariance matrices,
    wherein the comparing, computing, and generating are performed by a system including one or more computer processors.

2. The method of claim 1, wherein the effective number of bins for each frequency band of the plurality of frequency bands is calculated as a sum of filterbank response values for the frequency band.

3. The method of claim 1, wherein the generating the respective smoothed band-specific covariance matrix uses a first order auto-regressive low-pass filter.

4. The method of claim 3, wherein the use of the first order auto-regressive low-pass filter includes computing a difference between an input covariant matrix for the present frame and the previously generated value of the respective smoothed band-specific covariance matrix for the previous frame, the difference being weighted by the forgetting factor.

5. The method of claim 1, further comprising:
    setting the forgetting factor to a smaller value selected from a value pair including a calculated forgetting factor and a maximum permitted forgetting factor,
    wherein the setting is performed before the generating the respective smoothed band-specific covariance matrix for the present frame.

6. The method of claim 3, further comprising:
    detecting whether a transient occurs within a monitored frame; and
    resetting the low-pass filter in response to a detected transient.

7. The method of claim 6, wherein the detecting is performed by using aspects of a ducking decorrelator.

8. The method of claim 6, wherein the detecting is performed on all channels.

9. The method of claim 8, wherein the detecting detects that the transient occurs if any transient is detected on any channel for the monitored frame.

10. The method of claim 8, wherein the detecting detects that the transient occurs only if a transient occurs on a particular channel.

11. The method of claim 1, further comprising:
    storing the respective smoothed band-specific covariance matrix; and
    resampling the stored respective smoothed band-specific covariance matrix over the plurality of frequency bands.

12. A system comprising:
    one or more computer processors; and
    a non-transitory computer-readable medium storing instructions that, upon execution by the one or more computer processors, cause the one or more computer processors to perform operations of the method of claim 1.

13. A non-transitory computer-readable medium storing instructions that, upon execution by one or more computer processors, cause the one or more computer processors to perform operations of the method of claim 1.

14. An encoder comprising the system of claim 12.

15. A decoder comprising the system of claim 12.

16. A method of providing an audio service, the method comprising:
    receiving an input signal representing N audio channels, where N>1;
    dividing the input signal into a time-domain sequence of frames;
    transforming each frame of the time-domain sequence of frames into a respective frequency-domain representation having a plurality of frequency bands, each frequency band of the plurality of frequency bands including a respective plurality of frequency bins;
    for each frame of the time-domain sequence of frames, calculating, based on the frequency-domain representation of the frame, a respective set of band-specific N×N covariance matrices, each of the band-specific N×N covariance matrices having covariances of the N audio channels corresponding to a respective one of the plurality of frequency bands;
    for each frequency band of the plurality of frequency bands, calculating a respective smoothed band-specific covariance matrix by applying a low-pass filter to a sequence of band-specific N×N covariance matrices corresponding to the time-domain sequence of frames and further corresponding to the frequency band; and
    generating an audio signal for the audio service using the respective frequency domain representations of the time-domain sequence of frames and further using corresponding sets of the respective smoothed band-specific covariance matrices.

17. The method of claim 16, wherein the low-pass filter is a first order auto-regressive low-pass filter.

18. The method of claim 16, wherein the applying includes computing a difference between a value of an input covariance matrix for a current frame and a previously generated value of a smoothed covariance matrix for a previous frame, the difference being weighted by a forgetting factor.

19. The method of claim 16, further comprising:
    detecting whether a transient occurs within a monitored frame; and
    resetting the low-pass filter in response to a detected transient.

20. The method of claim 16,
    wherein the plurality of frequency bands includes a first frequency band and a second frequency band;
    wherein the first frequency band has a smaller number of frequency bins than the second frequency band; and
    wherein the second frequency band has higher frequencies than the first frequency band.

* * * * *